C. L. ELLIOTT.
HUB FOR VEHICLE WHEELS.
APPLICATION FILED JAN. 16, 1908.
905,673.
Patented Dec. 1, 1908.
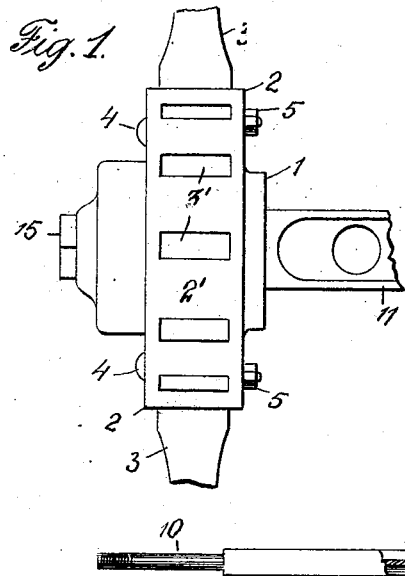
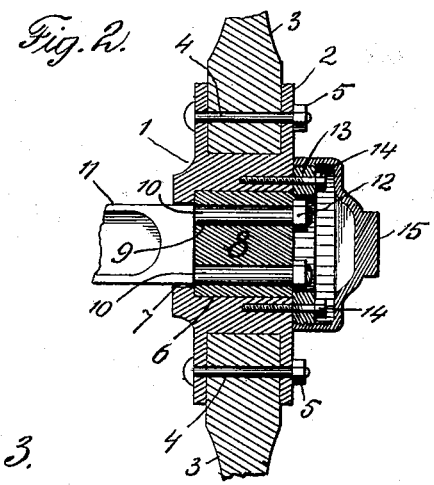
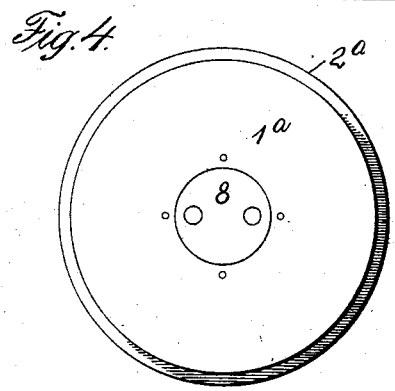
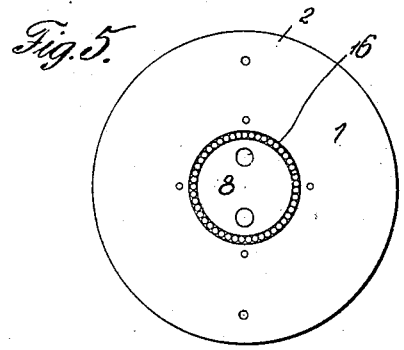
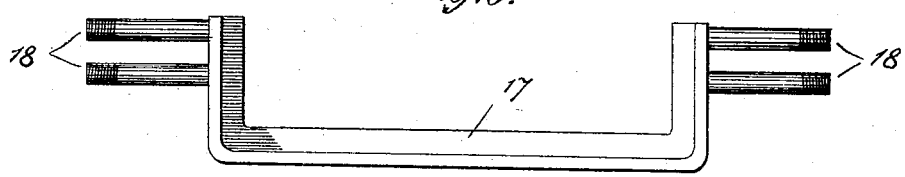
Inventor
C.L. ELLIOTT
Witnesses
By
Attorneys

UNITED STATES PATENT OFFICE.

CLARENCE L. ELLIOTT, OF McKEESPORT, PENNSYLVANIA.

HUB FOR VEHICLE-WHEELS.

No. 905,673.      Specification of Letters Patent.      Patented Dec. 1, 1908.

Application filed January 16, 1908. Serial No. 411,064.

*To all whom it may concern:*

Be it known that I, CLARENCE L. ELLIOTT, a citizen of the United States of America, residing at McKeesport, in the county of Allegheny and State of Pennsylvania, have invented certain new and useful Improvements in Hubs for Vehicle-Wheels, of which the following is a specification, reference being had therein to the accompanying drawing.

This invention relates to hubs for vehicles, and the invention has for its primary object to provide novel axle bearings for the wheel of a vehicle, wherein a large bearing surface is provided for the wheel.

Another object of my invention is to provide a novel wheel bearing that will permit of an axle being held in any desired position.

A further object of this invention is to provide a simple and inexpensive bearing for a wheel that can be easily renewed.

With the above and other objects in view which will more readily appear as the invention is better understood, the same consists in the novel construction, combination and arrangement of parts to be hereinafter more fully described and then specifically pointed out in the appended claims.

In the drawing: Figure 1 is a front elevation of a hub constructed in accordance with my invention, Fig. 2 is a vertical sectional view of the same, Fig. 3 is a plan of an axle partly in section, Fig. 4 is a side elevation of a pit car wheel constructed in accordance with my invention, Fig. 5 is a side elevation of the hub of a wheel illustrating a slight modification of my invention, and Fig. 6 is an elevation of an axle designed for drays and vehicles.

In the accompanying drawings, 1 designates a hub body having peripheral flanges 2 for spokes 3, said spokes being secured between the flanges 2 by bolts 4, and nuts 5. The said flanges 2 are connected at their outer edges by a band 2' integral with the flanges and having openings 3' to receive the tenons on the inner ends of the spokes.

The outer side of the hub body 1 is formed with a socket 6, while the inner side of the hub body is formed with a circular opening 7 communicating with the cylindrical socket 6. In the cylindrical socket 6 is mounted a cylindrical axle bearing 8, this bearing having two openings 9 formed therein to receive pins 10 carried by the end of the axle 11. The pins 10 are retained within the openings 9 of the bearing 8 by nuts 12, mounted upon the threaded ends of said pins. The circular opening 7 is of sufficient size to permit the hub to turn on the axle 11. The axle bearing 8 is retained within the cylindrical socket 6 by an exteriorly threaded ring 13, said ring being secured to the hub body 1 by a plurality of tap bolts 14. A cap nut 15 is threaded upon the ring to prevent dirt and foreign matter from entering the socket 6 and interfering with the rotation of the hub body upon the bearing 8.

Although the pins 10 are shown as disposed one above the other in the same vertical plane, it will be evident that they may be disposed in parallel relation in the same horizontal plane if desired.

In Fig. 4 of the drawings, I have illustrated a pit wheel 1ª provided with the usual flange 2ª, the axle bearing 8 being shown in position in the socket provided therefor in the said wheel. The ring 13 and the cap nut 15 have been omitted in this view, but it is to be understood that they may be used if desired, or, the wheel may be held on the axle by means of the nuts 12.

In Fig. 5 of the drawings, I have illustrated a slight modification of the wheel shown in Figs. 1 and 2, wherein suitable bearings 16 are interposed between the periphery of the bearing 8 and the inner sides of the cylindrical socket 6. Generally, these will be in the form of roller bearings, though it is obvious that by providing any of the usual forms of ball races, ball bearings may be employed. For drays and heavy vehicles, where the load is to be carried close to the ground, a yoke axle 17 provided with pins 18 can be used.

From the foregoing description taken in connection with the drawings, it will be observed that I have devised a strong and durable hub for wheels and a large bearing surface for the hubs upon the ends of an axle.

Since the bearing 8 and the pins 10 are normally held stationary with relation to the hub body 1, said hub body will not have a tendency to loosen the nuts 12 upon the ends of the pins. In consequence of this construction very little trouble will be encountered by vehicle wheels becoming accidentally detached from axles due to the displacement of nuts.

Having now described my invention what I claim as new, is:—

1. The combination of a hub body having a cylindrical socket formed therein, a cylindrical bearing mounted in said socket and on which said hub revolves, said bearing having openings formed therein, an axle, pins carried by said axle and received in said openings, an exteriorly threaded ring secured to said hub body for retaining said bearing in said socket, and a cap secured upon said ring.

2. The combination of a hub body having a socket formed therein, of a bearing mounted in said socket and on which the hub body revolves, an axle, pins carried by said axle and extending into said bearing, a ring for holding said bearing within said socket, and a cap screwed upon said ring.

In testimony whereof I affix my signature in the presence of two witnesses.

CLARENCE L. ELLIOTT.

Witnesses:
MAX H. SROLOVITZ,
K. H. BUTLER.